US008017076B2

(12) United States Patent
Luo et al.

(10) Patent No.: US 8,017,076 B2
(45) Date of Patent: Sep. 13, 2011

(54) SOLID-SOLID DIRECT-HEATING REACTION DISC ARRANGEMENT

(75) Inventors: Guochao Luo, Shenzhen (CN); Yan Chen, Shenzhen (CN)

(73) Assignee: Shenzhen Mindray Bio-Medical Electronics Co., Ltd. (CN)

( * ) Notice: Subject to any disclaimer, the term of this patent is extended or adjusted under 35 U.S.C. 154(b) by 413 days.

(21) Appl. No.: 11/978,032

(22) Filed: Oct. 25, 2007

(65) Prior Publication Data

US 2008/0102003 A1 May 1, 2008

(30) Foreign Application Priority Data

Oct. 26, 2006 (CN) ...................... 2006 2 0015427 U

(51) Int. Cl.
*G01N 31/00* (2006.01)
*B01J 19/00* (2006.01)

(52) U.S. Cl. ............................. 422/64; 422/62; 422/138

(58) Field of Classification Search .................... 422/64, 422/130, 62, 138
See application file for complete search history.

(56) References Cited

U.S. PATENT DOCUMENTS 4,256,696 A * 3/1981 Soodak ........................... 422/72
4,933,146 A * 6/1990 Meyer et al. .................... 422/63
5,292,482 A 3/1994 Manabe
6,183,693 B1 * 2/2001 Bogen et al. .................... 422/64
6,562,298 B1 * 5/2003 Arnquist et al. ................ 422/63
6,605,213 B1 * 8/2003 Ammann et al. ............. 210/222

FOREIGN PATENT DOCUMENTS

CN 2632681 Y 8/2004
CN 2862039 Y 1/2007
JP 63248451 A 10/1998
WO 0136982 A1 5/2001

OTHER PUBLICATIONS

Chinese Search Report for Chinese Patent Application No. 200620015427.x.
"AU2700" Chinese Medical Equipment Journal (2005), vol. 26, No. 10, pp. 60-61.
"Technical Renovation" China Academic Journal Electronic Publishing Housing (2003) 05-0047-0048.
English Abstract for JP63248451.

* cited by examiner

*Primary Examiner* — Jill Warden
*Assistant Examiner* — Dean Kwak
(74) *Attorney, Agent, or Firm* — Vista IP Law Group, LLP.

(57) ABSTRACT

The present invention discloses a solid-solid direct-heating reaction disc arrangement comprising a reaction disc body, clampers, a heater and a driving plate. Holding slots for receiving reaction cups are formed axially through the reaction disc body at constant intervals. The clampers are mounted to the bottom surface of the reaction disc body and each comprise an upper clamper and a lower clamper which are fastened together. The bottom surfaces of the reaction cups rest on the upper clamper. The heater is sandwiched between the upper and lower clampers for heating the reaction disc body and the reaction cups. The driving plate is mounted to a supporting plate of the reaction disc body. By arranging the reaction disc body, the clampers, the heater and the driving plate in a receiving chamber defined by a cover and an insulation casing, a closed temperature control system is formed.

12 Claims, 5 Drawing Sheets

SOLID-SOLID DIRECT-HEATING REACTION DISC ARRANGEMENT

CROSS-REFERENCE TO RELATED APPLICATION(S)

This application claims foreign priority under Title 35, United Stats Code, §119(a)-(d) or §365(b) to Chinese Patent Application No. 200620015427.X, which was filed on Oct. 26, 2006 into the State Intellectual Property Office of the People's Republic of China.

TECHNICAL FIELD

The present invention relates to the field of automatic biochemical analyzing equipments, especially to a solid-solid direct-heating reaction disc arrangement for a biochemical analyzing equipment.

BACKGROUND ART

Nowadays, thermostating or constant temperature control in automatic main-flow biochemical analyzers is performed mainly in three ways: air bath (air dry bath), water bath/thermostating liquid bath, and solid-solid direct-heating (thermostating by direct contact between solid objects). By adopting an air bath thermostat, a simple structure can be provided, the system temperature can be increased or decreased in a moderate speed, and no maintenance is needed. However, air bath thermostats suffer from that the temperature is likely to be affected by the environment and is thus unstable, and the increasing and decreasing of the liquid in the reaction cups are slow. Water bath/thermostating liquid bath has the advantage that the temperature is even and stable as well as the disadvantages that the increasing and decreasing speeds of the system temperature are low, the preheating time in the start-up stage is long, and the quality of water may be changed (such as microorganism growth and mineral substance deposition) which may affect the photo sensing in the optical path of the system and thus needs a frequent maintenance. In a system adopting a solid-solid direct-heating thermostat, the temperature of the liquid in the reaction cups can be increased and decreased quickly, and the temperature can be kept stable and even.

In known solid-solid direct-heating structures, there is a reaction disc body composed of, among other components, a bottom plate, a main plate and five reaction cup clampers. The main plate and the reaction cup clampers are attached to the bottom plate. Half-slots for keeping reaction cups are formed in the main plate and the reaction cup clampers respectively in corresponding locations. After the main plate and the reaction cup clampers are assembled to the bottom plate, each facing pair of the half-slots form a holding slot which has a rectangular or square sectional shape for keeping a reaction cup. The reaction cups, once inserted into the holding slot, are clamped by the clampers. Such a solid-solid direct-heating structure has the following defects. First, it is difficult to arrange a heat source. Second, each rectangular or square holding slot is composed by two half-slots formed in the clamper and the main plate respectively, thus the structure is relatively complex.

SUMMARY OF INVENTION

A main object of the present invention is to overcome the above shortages existed in the prior art by providing a solid-solid direct-heating reaction disc arrangement which is easy to arrange a heater and which has a simple structure.

A further object of the present invention is to improve the solid-solid direct-heating reaction disc arrangement so that it has low temperature fluctuation and high dynamic temperature increasing ability.

To achieve the above main object, the present invention provides a solid-solid direct-heating reaction disc arrangement comprising a reaction disc body, clampers, a heater and a driving plate, wherein the reaction disc body has an integral ring structure, holding slots for receiving reaction cups are formed axially through the reaction disc body at constant intervals, the clampers are mounted to the bottom surface of the reaction disc body and each comprise an upper clamper and a lower clamper which are fastened together, the bottom surfaces of the reaction cups rest on the upper clamper, the heater is sandwiched between the upper and lower clampers for heating the reaction disc body and the reaction cups, and the driving plate is mounted to a supporting plate of the reaction disc body for receiving a power supply to drive the reaction disc body, the clampers and the heater rotate collectively.

According to an embodiment of the present invention, preferably, sensor mounting holes are formed in the bottom surface of the reaction disc body, and an annular wiring duct is formed in the supporting plate, the sensor mounting holes communicate with the wiring duct via radial communication holes formed in the reaction disc body.

According to an embodiment of the present invention, preferably, a water blocking dam which is higher than the wiring duct is formed on the supporting plate between the wiring duct and the holding slots, the water blocking dam and the driving plate forming a labyrinth-type water proof structure.

According to an embodiment of the present invention, preferably, the upper clamper, the heater and the lower clamper each have an annular structure.

According to an embodiment of the present invention, preferably, the driving plate has a disc structure adapted to block the heat transfer from the reaction disc body.

According to an embodiment of the present invention, preferably, the driving plate is made of a heat insulating material such as a non-metal material.

According to an embodiment of the present invention, preferably, the reaction disc arrangement further comprise a fixed enclosure, which is composed of an upper cover and a lower insulation casing, with the reaction disc body, the clampers, the heater and the driving plate being disposed in the enclosure.

According to an embodiment of the present invention, preferably, each of the cover and the insulation casing is made of a heat insulating material such as a non-metal material.

According to an embodiment of the present invention, preferably, a drain element is mounted to the bottom wall of the insulation casing, for discharging water spilled out from the reaction cups.

According to an embodiment of the present invention, preferably, an elastic flap is nested in each of the holding slots, and the reaction cups are held in the holding slots of the reaction disc body by the elastic forces of the elastic flaps respectively.

The present invention can thus obtain advantages over the prior art. Specifically, since the heater as sandwiched between the upper and lower clampers, it is easy to dispose and assemble the heater. Further, the holding slots for receiving the reaction cups are formed in the reaction disc body having an integral ring structure, thus the whole structure is simple.

According to a preferred embodiment of the present invention, when the solid-solid direct-heating reaction disc arrangement comprises a fixed enclosure composed of an upper cover and a lower insulation casing, the reaction disc body, the clampers, the heater and the driving plate are arranged in a receiving chamber defined by the cover and the insulation casing, thus a closed temperature control system is formed which can improve the anti-environment-disturbance ability and suppress the temperature fluctuation. By means of the closed temperature control system, the temperature of the liquid contained inside the reaction cups can be increased quickly.

BRIEF INTRODUCTION TO THE DRAWINGS

The present invention will be described in details with reference to the drawings in which.

DETAILED DESCRIPTION OF THE PREFERRED EMBODIMENTS

Figure 1:
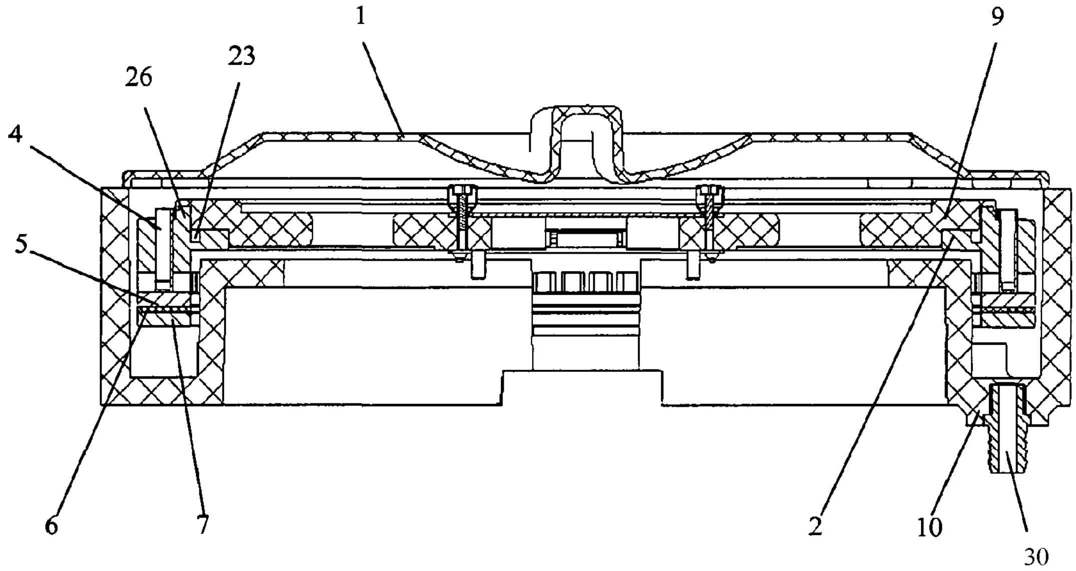
FIG. 1 is a sectional view of a solid-solid direct-heating reaction disc arrangement of an embodiment of the present invention.
Figure 2:
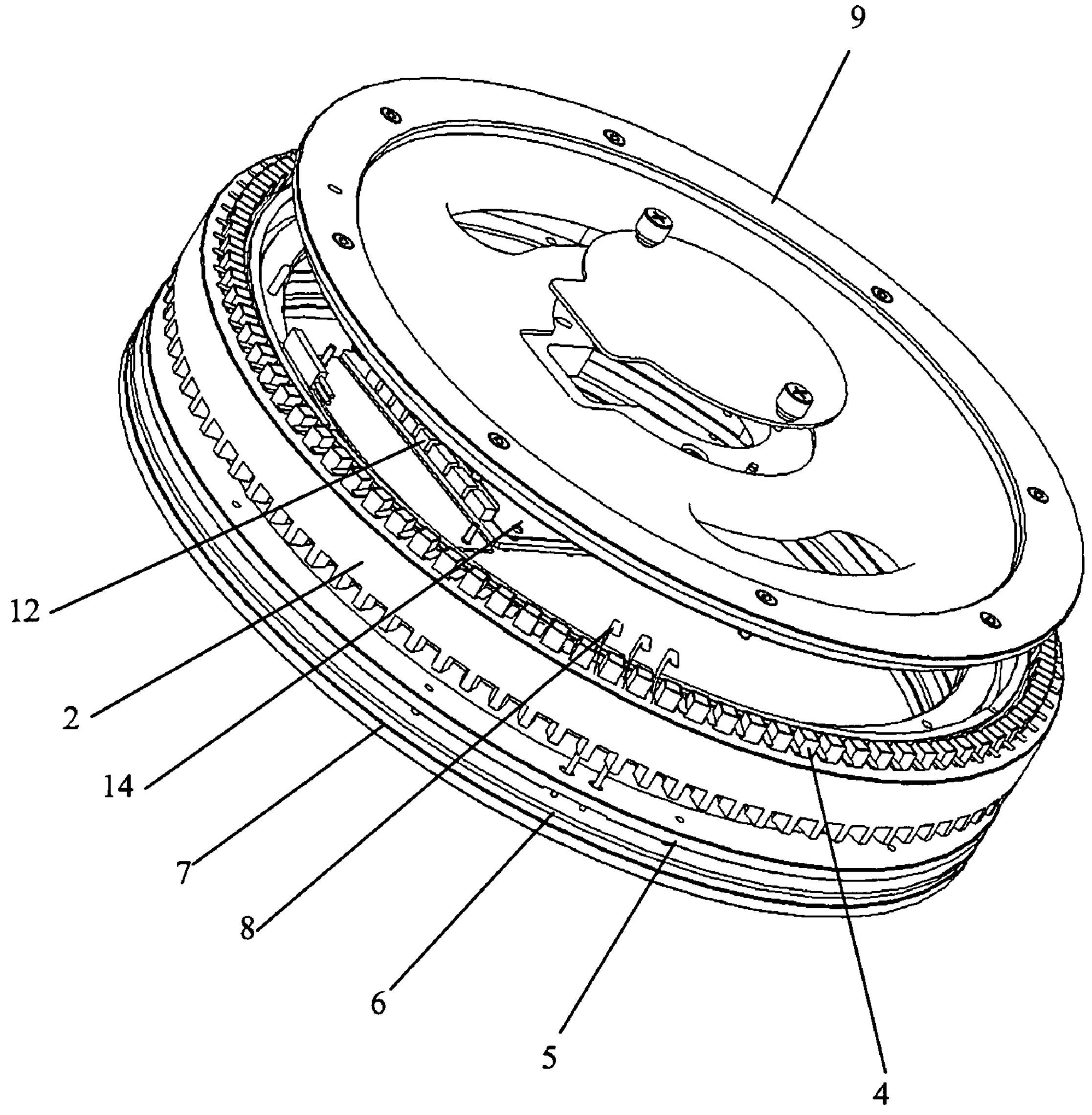
FIG. 2 is a perspective exploded view of the solid-solid direct-heating reaction disc arrangement (without the cover and the insulation casing)
Figure 3:
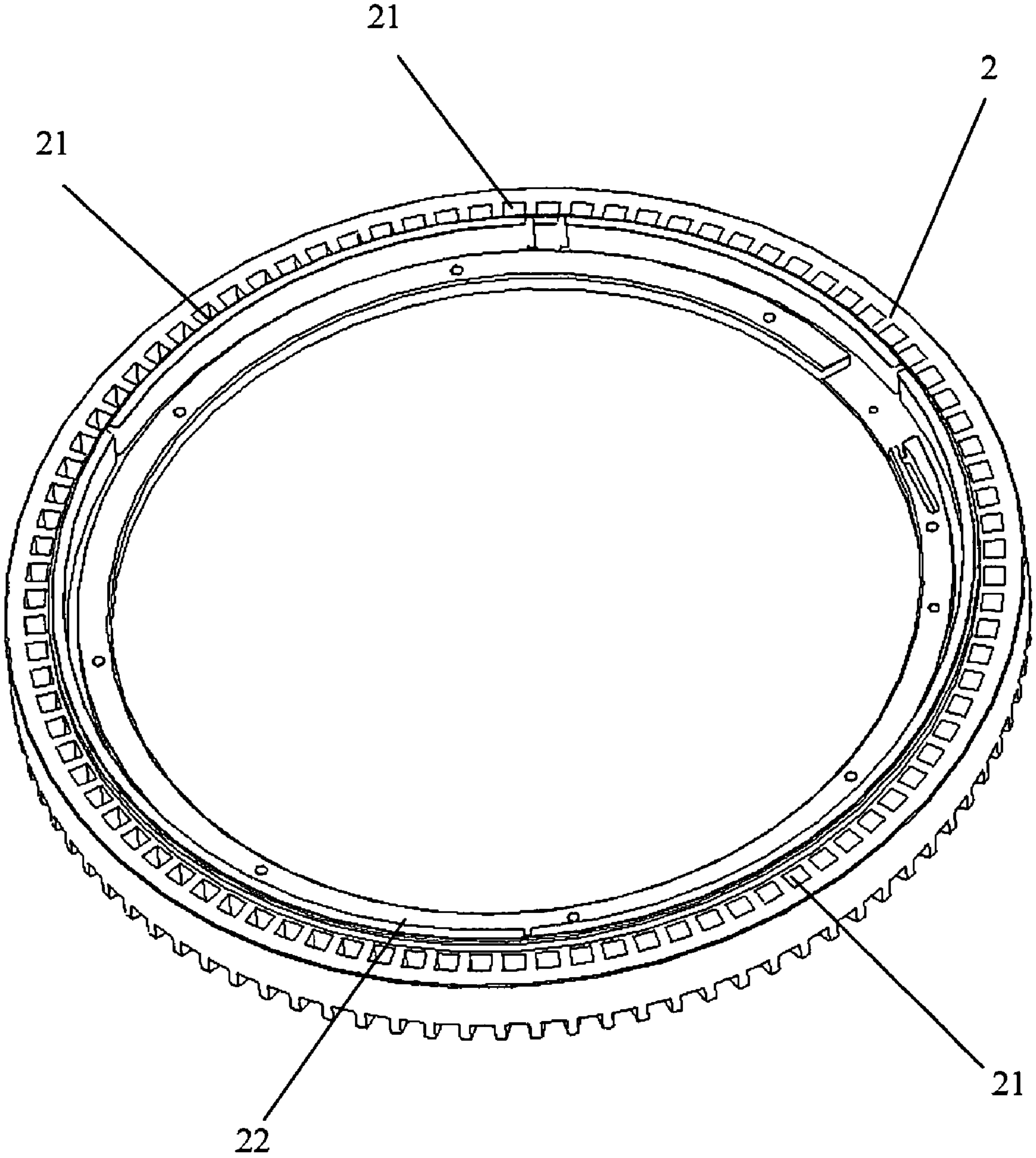
FIG. 3 is a perspective view of a reaction disc body of the solid-solid direct-heating reaction disc arrangement.
Figure 4:
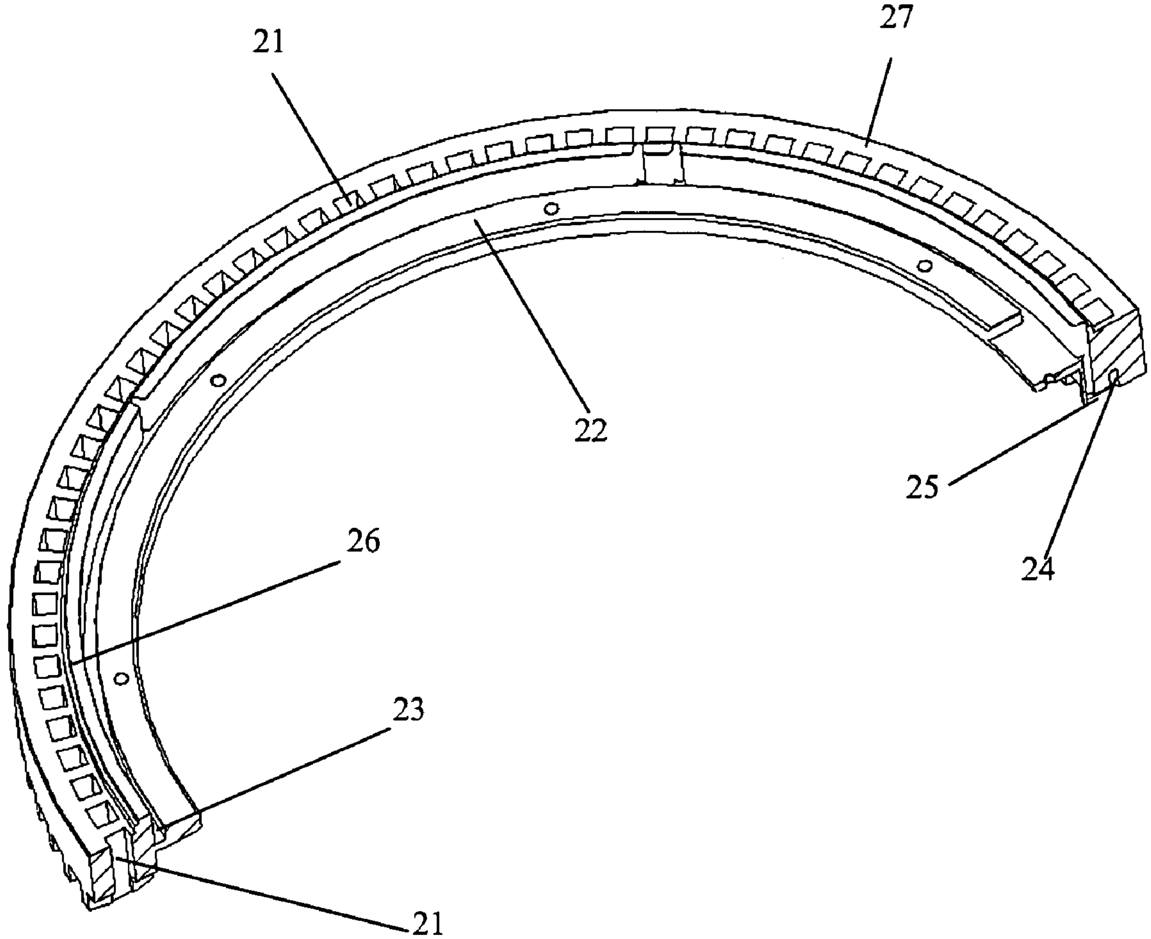
FIG. 4 is a schematic cut-away perspective view of the wiring duct of the reaction disc body of the solid-solid direct-heating reaction disc arrangement.
Figure 5:
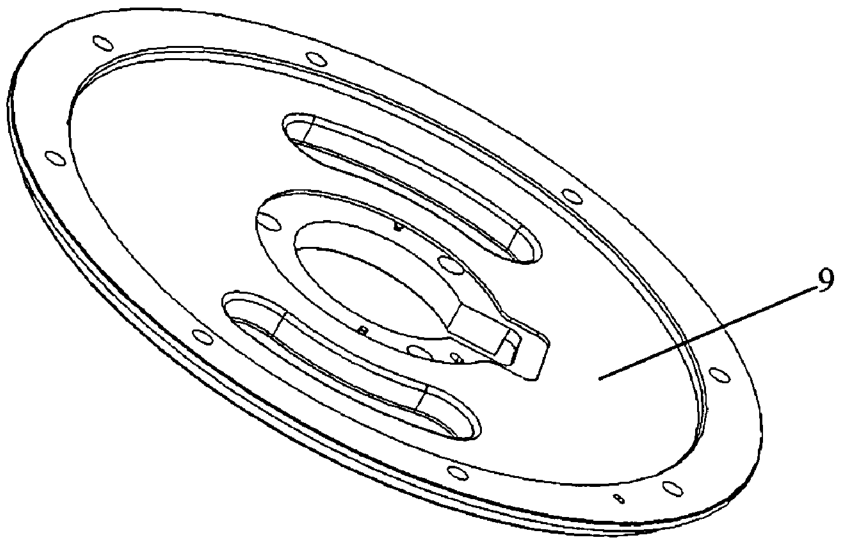
FIG. 5 is a perspective view of a driving plate of the solid-solid direct-heating reaction disc arrangement.
Figure 6:
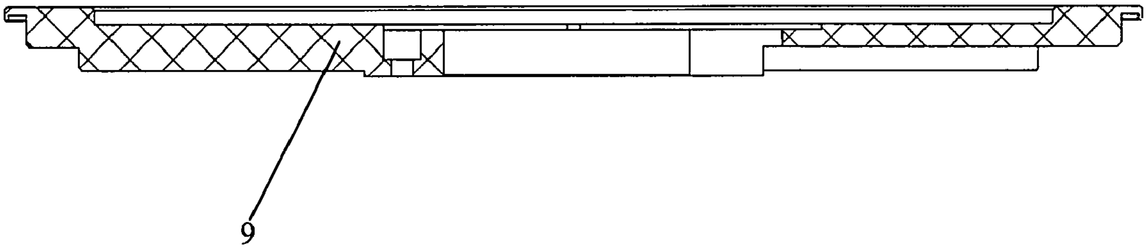
FIG. 6 is a sectional view of the driving plate of the solid-solid direct-heating reaction disc arrangement.
Figure 7:
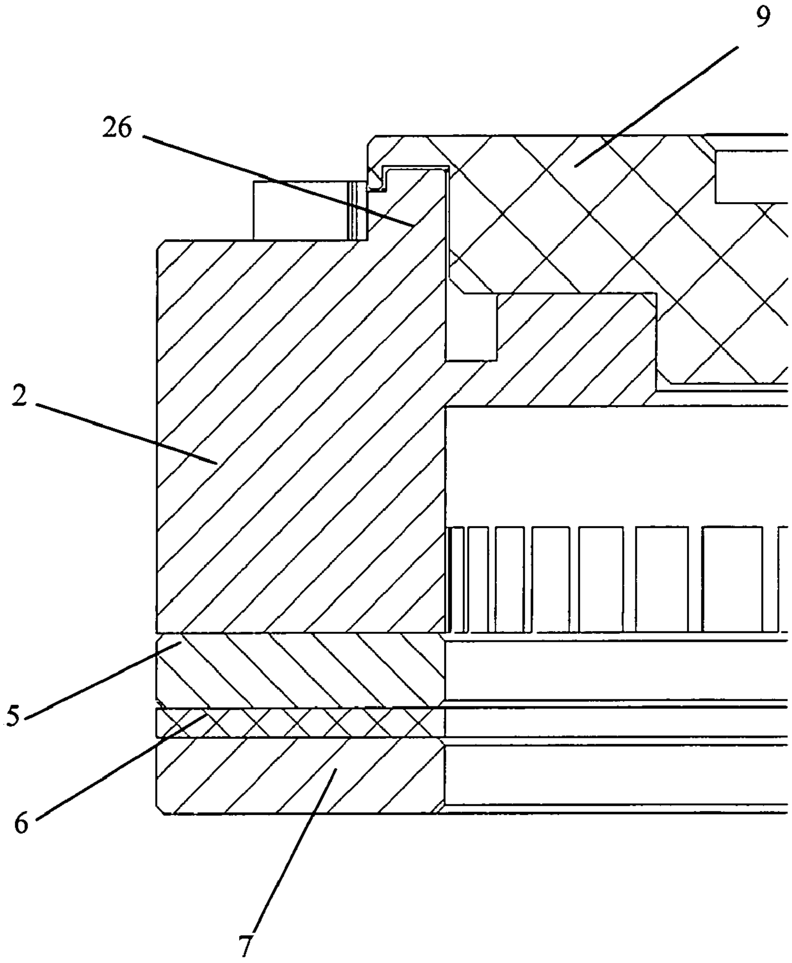
FIG. 7 is a schematic sectional view of a labyrinth-type water proof structure of the solid-solid direct-heating reaction disc arrangement, which is composed of a driving plate and a water blocking dam.

Referring to FIGS. 1 to 7, an embodiment of the solid-solid direct-heating reaction disc arrangement of the present invention comprises a reaction disc body 2, an upper clamper 5, a heater 6 and a lower clamper 7.

The reaction disc body 2 has an integral ring structure formed of metal. The reaction disc body 2 comprises a plurality of holding slots 21 extended there through in an axial direction and disposed in equal distance along its whole circumference, and an annular supporting plate 22 extended inwardly of the holding slots in a radial direction. Reaction cups 4 are received and held in the holding slots 21. The holding slots 21 may have various cross-section shapes, such as square, rectangular, round and elliptical shapes, as known in the art. The supporting plate 22 is formed with a recessed annular wiring duct 23. The number of the reaction cups 4 corresponds to that of the holding slots 21 in the reaction disc body. The reaction cups 4 are inserted into corresponding holding slots 21, with the bottom surfaces of the reaction cups 4 resting on the upper clamper 5. An elastic flap 8 is nested in each holding slot 21 and bias against the reaction cup. By means of the elastic force generated by the elastic deformation of the elastic flap 8, the reaction cup 4 is held to the reaction disc body 2. The upper clamper 5, the heater 6 and the lower clamper 7 each have a integral circular structure, with the upper clamper 5 and the lower clamper 7 sandwiching the heater 6. The upper clamper 5, the lower clamper 7 and the heater 6 are secured together by fasteners such as screws and. then the assembly of them is attached to the bottom surface of the reaction disc body 2. The heater 6 can simultaneously heat the reaction disc body 2 and the bottoms of the reaction cups 4. The heat energy absorbed by the reaction disc body 2 is uniformly distributed to the holding slots 21 in the reaction disc body and thus heats the four sides of reaction cups 4 held in the holding slots 21. In order to prevent the heat energy from dispersing into the atmosphere from the lower clamper 7, an insulation casing 10, which is made of a heat insulating material such as a non-metal material, is arranged under the reaction disc body 2. Similarly, in order to prevent the heat energy from dispersing into the atmosphere from the upper surface of the reaction disc body 2, a cover 1 and a driving plate 9, each made of a heat insulating material such as a non-metal material, are arranged above the reaction disc body 2. In this way, the insulation casing 10 and the cover 1 form a fixed insulation enclosure. This enclosure and the reaction disc body 2 and the driving plate 9 form a closed temperature control system, which, by assistance of the heater, the sensors and the temperature protective switches, provides a highly precise thermostating environment to the reaction cups.

The driving plate 9 receives a power or energy input to drive the whole reaction disc arrangement to rotate, and the driving plate 9 has a disc like structure which blocks the heat transfer from the reaction disc body 2. The driving plate 9 is mounted to the supporting plate 22 of the reaction disc body 2 by fasteners such as screws.

To achieve a precise control to the solid-solid direct-heating reaction temperature, a number of sensor mounting holes 24 are formed in the bottom surface of the reaction disc body in a regular interval, and sensors are mounted in the sensor mounting holes 24 in an up-down inversed orientation. Leads or wirings of the sensors are led out through radial communication holes 25 which are formed radially through the reaction disc body 2, then extend along the wiring duct 23 which is formed in a circumferential direction in the reaction disc body, and are finally terminated in a plug-in socket member 12 of a patch board 14. Leads or wirings of the heater 6 extend through wiring through holes which are formed in the upper clamper, extend into the communication holes 25 of the reaction disc body, and then extend along the wiring duct 23 to the patch board. Thus, the sensor mounting holes in the bottom of the reaction disc, the communication holes, the wiring through holes of the upper clamper, the wiring duct of the reaction disc body and the patch board form a closed wire routing structure.

To avoid water which is unexpectedly spilled out from the reaction cups from flowing into the wiring duct of the reaction disc body and soaking the wires and the patch board and thus causing safety faults, a water blocking dam 26 having a certain height is formed on the supporting plate 22 of the reaction disc body 2 between the wiring duct 23 and the reaction cups 4. The water blocking dam 26 and a groove formed in the driving plate 9 form a labyrinth-type water proof structure. Specifically, the water blocking dam 26 separates the wiring duct 23 and the upper end surface 27 of the reaction disc body, thus the water spilled out from the reaction cups can only flow along the upper end surface of the outer periphery of the reaction disc body to the bottom surface of the insulation casing 10. A drain element 30, such as a pipe fitting, is mounted to the bottom wall of the insulation casing 10, for discharging the water collected in the insulation casing to the outside of the insulation casing.

Additionally, an optical trapping path may be arranged at the bottom of the reaction disc body for sensing the liquid in the reaction cups. In this case, in order to allow as more as possible lights to pass the optical trapping path, chamfers of certain angles are formed on the inner and outer peripheries of the bottom of the reaction disc body.

The solid-solid direct-heating reaction disc arrangement of the present invention can provide one or more of the following advantages:

The anti-environment-disturbance ability is improved, and the temperature fluctuation is lowered;

The dynamic temperature increasing ability of the liquid in the reaction cups is increased, because the solid-solid direct-heating reaction disc arrangement promotes the temperature of the liquid in the reaction cups to be increased quickly, so that the temperature of the agent can be increased from a lower storage temperature of about 4° C. to about 37° C. in a short period of time and a constant-temperature can be maintained;

The reaction disc body is of an integral structure, in which holding slots for holding reaction cups are formed directly without splitting as those in the prior art, thus the whole structure is simple and cost effective; and The reaction cups are fitting in corresponding holding slots with clearances, and the reaction cups are clamped from a side by the force generated by the elastic deformation of the elastic flap, thus the optical surfaces of the reaction cups are not likely to be damaged.

The present invention is described with reference to its preferred embodiments which are not intended to restrict the scope of the present invention. A skilled in the art will readily recognize that modifications and changes can be made to the embodiments without departing from the spirit of the present invention, and accordingly all these modifications and changes may be regarded as falling within the scope of the present invention.

What is claimed is:

1. A direct-heating reaction disc arrangement comprising:

a reaction disc body, a plurality of clampers, a heater, and a driving plate, wherein the reaction disc body comprises holding slots for receiving reaction cups, the plurality of clampers are mounted under a bottom surface of the reaction disc body, and each of the plurality of clampers comprises an upper clamper and a lower clamper both of which are mounted under the bottom surface of the reaction disc body, the heater is sandwiched between the upper clamper and the lower clamper configured to improve conductive heat transfer to the reaction disc body and the reaction cups through at least the upper clamper, at least a portion of a bottom surface of at least one of the reaction cups directly contacts an upper surface of the upper clamper with the lower clamper to sandwich the heater for the improved conductive heat transfer from the heater through at least the upper clamper to the reaction cups, and the driving plate is mounted to one or more supporting flanges of the reaction disc body for receiving a power supply to drive the reaction disc body, wherein the one or more supporting flanges are part of an integral and inseparable structure of the reaction disc body configured to support or secure the driving plate to the reaction disc body.

2. The direct-heating reaction disc arrangement of claim 1, wherein a plurality of sensor mounting holes are formed in the bottom surface of the reaction disc body, and an annular wiring duct is formed in the one or more supporting flanges, the plurality of sensor mounting holes communicate with the wiring duct via one or more radial communication holes formed in the reaction disc body.

3. The direct-heating reaction disc arrangement of claim 2, wherein a water blocking dam which is higher than the wiring duct is formed on the one or more supporting flanges between the wiring duct and holding slots, the water blocking dam and the driving plate forming a labyrinth-type water proof structure.

4. The direct-heating reaction disc arrangement of claim 1, wherein at least one of the upper clamper, the heater, and the lower clamper has an annular structure.

5. The direct-heating reaction disc arrangement of claim 1, wherein the driving plate comprises a disc structure adapted to reduce heat dissipation from the reaction disc body.

6. The direct-heating reaction disc arrangement of claim 5, wherein a body of the driving plate is made of a thermally insulating material.

7. The direct-heating reaction disc arrangement of claim 1, wherein the reaction disc arrangement further comprises an enclosure, which comprises at least an upper cover and a lower insulation casing and encloses at least in part the reaction disc body, the clampers, the heater, and the driving plate.

8. The direct-heating reaction disc arrangement of claim 7, wherein each of a body of the cover and a body of the insulation casing is made of a thermally insulating material.

9. The direct-heating reaction disc arrangement of claim 7, wherein a drain element is mounted to a bottom wall of the lower insulation casing for discharging fluids.

10. The direct-heating reaction disc arrangement of claim 1, wherein an elastic flap is nested in one of the holding slots, and one of the reaction cups is held in one of the holding slots of the reaction disc body by the elastic force of the elastic flap.

11. The direct-heating reaction disc arrangement of claim 1, in which at least one of the reaction cups contacts a respective holding slot of the holding slots on two or more sides or on a circumference of the at least one of the reaction cups for the improved conductive heat transfer.

12. The direct-heating reaction disc arrangement of claim 1, in which the heater is sandwiched between the lower clamper and a lower surface of the upper clamper.

* * * * *